United States Patent [19]

deBruyne

[11] 3,731,317

[45] May 1, 1973

[54] VIBRATING WEB TRANSPORT APPARATUS

[75] Inventor: Pieter deBruyne, Burlington, Mass.

[73] Assignee: RCA Corporation, New York, N.Y.

[22] Filed: Dec. 21, 1970

[21] Appl. No.: 100,279

[52] U.S. Cl...................346/107 R, 346/69, 346/136, 352/222, 352/225

[51] Int. Cl...........................G01d 15/28, G03b 1/48

[58] Field of Search........................346/69, 107, 108, 346/109, 110, 136; 352/225, 222

[56] References Cited

UNITED STATES PATENTS 3,643,021 2/1972 DeBlance..............................178/15

1,521,007 12/1924 Chubb..................................346/69

3,137,221 6/1964 Watts.............................352/225 X 3,151,521 10/1964 Atkin et al.......................352/225 X

*Primary Examiner*—Joseph W. Hartary

*Attorney*—Edward J. Norton

[57] ABSTRACT

A technique for providing information transducing with a moving optical record medium so that a desired transducing resolution is achieved while preventing abrasion damage to the recording medium and build up of foreign substances in the information interface. This is accomplished by vibrating the medium into intermittent contact with an image forming means, which is enabled only during the contacting relation, to transduce information with the recording medium.

3 Claims, 3 Drawing Figures

INVENTOR.
PIETER deBRUYNE
BY
James B. Hayes
ATTORNEY

VIBRATING WEB TRANSPORT APPARATUS

This invention relates to a system for transducing information with an optical record medium. The invention is useful in, although not restricted to, applications for a strip type photographic camera using a gated image intensifier. Gated intensifier cameras are useful in taking range gated photographs, to eliminate back scatter and other disturbing illuminations. Gating may also be used to select one of several images present at the photocathode in a time slot multiplexed system. The intensifier is also a convenient converter from the near infrared (GaAs at 8,500 A) to the blue of P11, where high resolution films have better sensitivity. Fiber optics provides an efficient way to transfer the output energy onto the film. Where fiber optics have been used it has been shown that a gap between the fiber optic output coupling the intensifier and the film affects the obtainable resolution. It is therefore important to minimize or eliminate this gap when transducing information with the film. It is also important to prevent accumulation of dirt and loose abrasive materials, which can scratch and therefore spoil the resulting photographs.

To solve these problems, in accordance with the invention, an optical record medium such as a film is transported past an optical transducer which is coupled to or forms a part of an image forming means. The record medium is caused to vibrate or oscillate by a moving platen which is in spaced relation to the record medium. The record medium is therefore brought into contacting relation with the optical transducer at recurrent intervals. The image forming means, which is normally disabled, is enabled in synchronism with the drive to the vibrating platen. The drive to the vibrating platen and the enabling of the image forming means are synchronized such that, information is transduced with the record medium only when the record medium is in contacting relation with the optical transducer. Due to the action of the vibrating platen, the record medium which is transported in tension past the transducer, carries out a series of hops across the transducer. the friction to the motion of the record medium past the recording head is thus low because the film is vibrating. Dirt particles are kept in motion, so they walk across the transducer and do not accumulate and cause abrasion. At the same time, transducing of information is accomplished during the contact period of the film with the optical transducer to therefore provide the desired resolution. In addition accumulation of dirt at the transducer is prevented, by action which is comparable to the action of ultrasonic cleaning. Furthermore no critical adjustment of rollers or clearances are required in the record medium transport.

Briefly in accordance with the invention, a system is provided having means for transducing information for the record medium moved in a path past a transducing means. Means are provided for mounting the transducing means in cooperative relation with the path of the record medium. Means are provided for producing oscillatory motion between the record medium and the transducing means as the record medium traverses the path, to provide alternate in contact and non-contact relation between the transducing means and the record medium. Means are also provided for synchronously enabling transducing means in accordance with the oscillatory motion of the record medium with respect to the transducing means, to provide transducing with the record medium only during the contacting relation.

Figure 1:
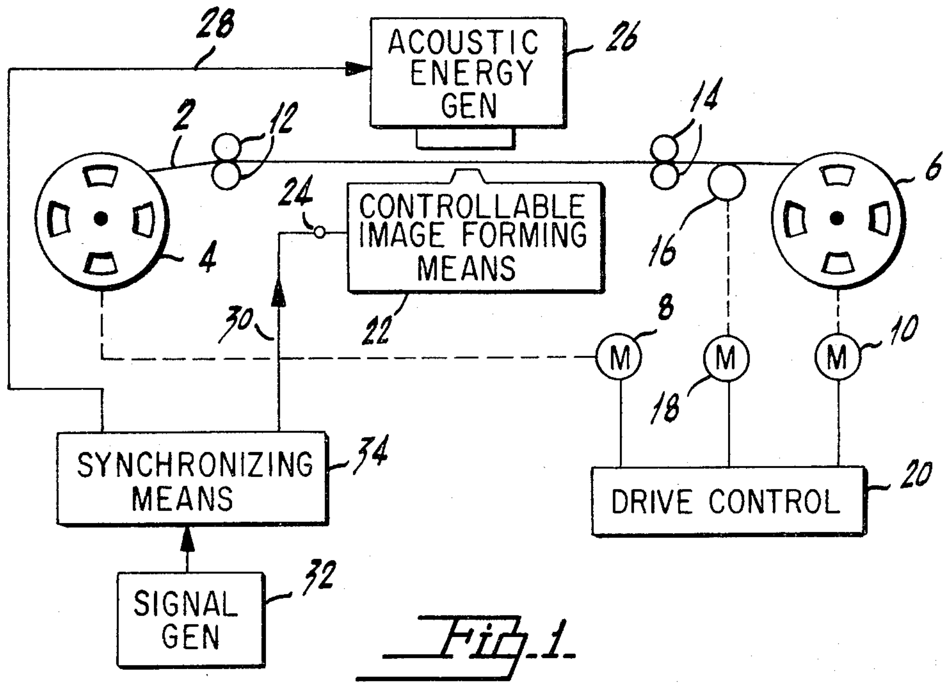
FIG. 1 is a diagrammatic view of an embodiment of the invention.

In FIG. 1 there is shown a transport arrangement for an optical record medium 2 such as photographic film. The medium 2 extends between a supply reel 4 and a takeup reel 6. The supply reel 4 and takeup reel 6 are driven by motors 8 and 10 respectively. The medium 2 is disposed and guided along a path defined by roller pairs 12 and 14. The medium 2 is transported along the path by a drive member 16 such as a capstan. Where the medium 2 is a perforated film, the member 16 may for example by a sprocket wheel which is driven by the motor 18. The motors 8, 10 and 18 are operated from a drive control 20, to transport medium 2 in tension along the path between the reels 4 and 6 at a desired speed, which for example may be in the range of 0.5–5.0 inches per second. An image forming means 22 is disposed adjacent the path of the medium 2. The image forming means includes output means which are cooperatively disposed with respect to the working surface of medium 2. The image forming means is normally disabled from transmitting or transducing information with the medium 2, in the absence of an enabling signal at its input 24. In practice of the invention, the image forming means 22 may for example include a gated image intensifier. Or alternatively the controllable image forming means 22, may comprise a known type of electronic and/or mechanical shutter means. An acoustic energy generator means 26 is mounted in spaced relation to the medium 2. Generator 26 may comprise a platen with a loudspeaker type drive or other suitable means for exerting acoustic or sound pressure on the medium 2. The force exerted by the generator 26 on the tension medium 2, causes the medium 2 to be vibrated or oscillated transverse to the transport path. The magnitude of the vibratory oscillation of the medium 2 is made to be a sufficient magnitude, to cause intermittent contact between the medium 2 and the output of the image forming means 22, as the medium 2 is transported along the path. The drive signal for the generating means 26 on lead 28 and an enabling signal for the image forming means on lead 30 are derived from a signal generator 32. The output of signal generator 32 supplies the signals on lead 28 to 30 through a synchronizing means 34. The synchronizing means 34 may contain for example, variable delay means or other suitable circuitry for adjusting the relative phase or timing of the signals on leads 28 and 30. The relationship between the signals on leads 28 and 30 are arranged to cause image forming means 22 to be enabled, only during the intermittent period when contacting relation exists between the record medium 2 and the output of the image forming means 22.

Figures 2, 3:
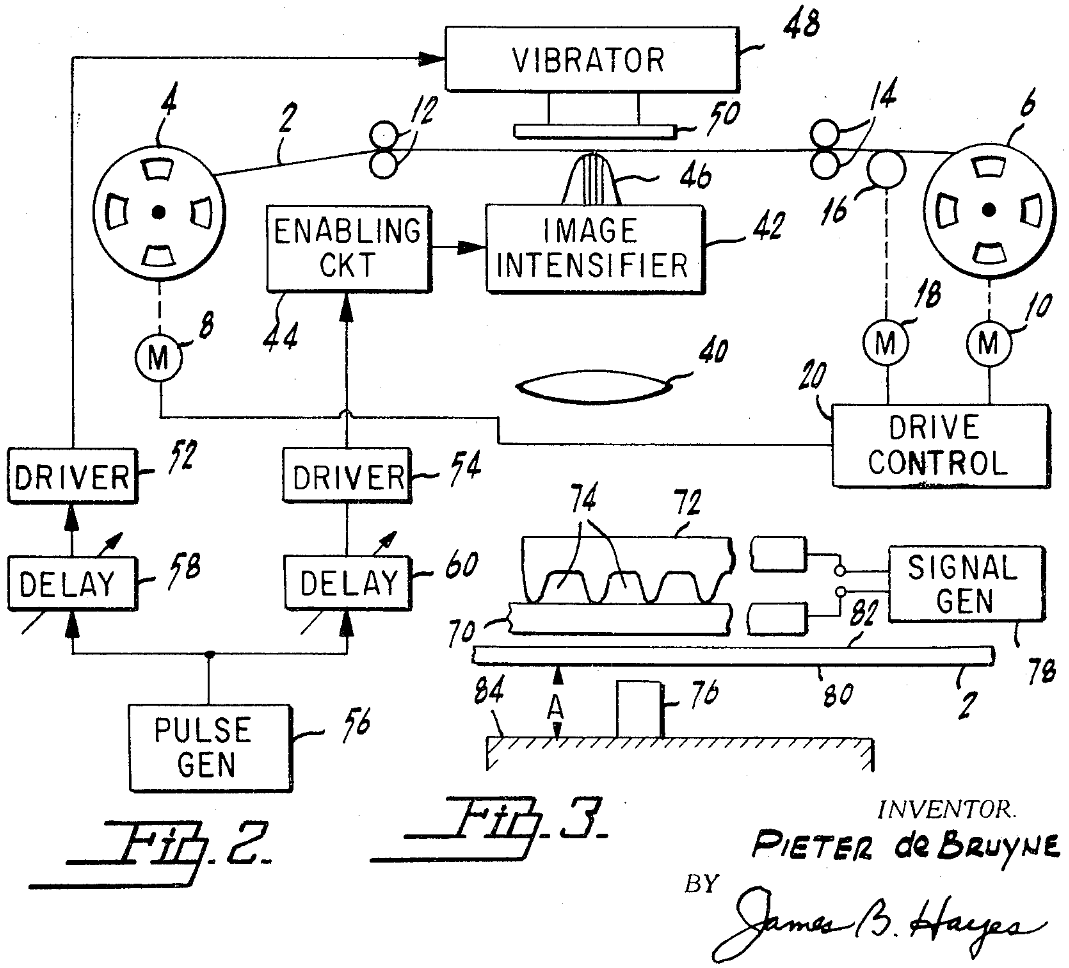
FIG. 2 is a diagrammatic view of a further embodiment of the invention.
FIG. 3 is a detailed view of a portion of the invention which may be utilized in the embodiment of FIGS. 1 and 2.

FIG. 2 shows a further embodiment of the invention, in which like numbered elements correspond with those shown and described with regard to FIG. 1. In FIG. 2 the image forming means includes a lens 40 and image intensifier 42, which is a type which may be gated on and off by an enabling circuit 44. The image formed by the intensifier 42 is transmitted or transduced with the record medium 2 by means of a fiber optic coupler 46. One end of the fiber optic coupler 46 is disposed to receive the image from the intensifier 42, while the other end of the coupler 46 is disposed in spaced relation and adjacent the record medium 2. As indicated, where fiber optic coupling means is utilized for transducing information with the medium 2, it is preferable in order to obtain the desired resolution, that the medium 2 be in contact with the fiber optic coupling means 46 when information is to be transduced with the medium 2. However it is also desirable to minimize the accumulation of dirt and abrasive materials which may cause scratching of the medium 2, due to prolonged in motion contact between the medium 2 and a transducing means such as the coupler 46. Therefore where the medium 2 is such as a photographic film, the output end of coupling means 46 is disposed in spaced relation with the emulsion side of such film. A vibrator means 48 is arranged in spaced relation on the other side of the film 2 and substantially opposite the coupling means 46. The vibrator means 48 for example may comprise an electrostatic loudspeaker, including a vibrating film platen 50 which utilizes a DC biasing arrangement. Alternatively a vibrator utilizing electret polarization materials which do not require a bias, and which will be discussed further hereinafter, may also be utilized. The film 2, which for example may be approximately one-half mil thick and 5 inches wide, is transported with a tension such as approximately 5 pounds along a path between and in spaced relation with the fiber optic transducing means 46 and the platen 50. The vibrator 48 which is energized with an alternating signal from the driver circuit 52, exerts a variable acoustic pressure on the film 2 which is transverse to the direction of the film path. This pressure on the tensioned film 2 results in vibration or oscillation of the film 2, such that spaced portions of the film 2 are brought into contacting relation with the output end of the coupler 46 as the film 2 is transported along the path. In order that information be transduced or transmitted to the film 2 only during the period of contacting relation between the coupling means 46 and the film 2, the control signal for the enabling circuit 44 from the driver 54 is caused to have a synchronized relation with the output of driver 52. This is accomplished by providing a pulse generator 56 which for example may have a repetition rate in the range of 5 to 15 KHz. The output of the pulse generator 56 is coupled through variable delay means 58 and 60 to the respective drivers 52 and 54. The delay means 58 and/or 60 may then be adjusted, to provide the synchronized operating relation between the vibrator 48 and the image intensifier 42.

If reference is made to FIG. 3, there is shown an embodiment including an acoustic energy generator or vibrator which may be utilized with the arrangement shown and described with regard to FIGS. 1 and 2. In FIG. 3 a movable platen 70, which may be fabricated from a material such as aluminized mylar or electret plastic about 0.1 mm thickness, is placed in contact relation with a backing plate 72. Undulations 74 are provided in the backing plate 72 which may for example be made of Aluminum. The undulations 74, which for example may have an average depth of about 0.5 mm and width of 1.0 mm, provide a desired response at about a 5 KHz energizing frequency of the device. The platen 70, which for example may have dimensions 120 mm × 30 mm and 0.1 mm thickness, is spaced from the tensioned film 2 by a distance of approximately 0.2 mm. The film 2 which itself may be approximately 0.1 mm thick is preferably spaced from an optical transducer 76, by a distance such as 10 to 40 microns. A voltage of about 500 VRMS at 5 kilohertz, provided by the signal generator 78 should produce about 100 millibar acoustic pressure under load, sufficient for providing a vibrational amplitude of the film of about 0.1 mm.

Considering the motion of the film platen for an excitation frequency of 5 KHz and maximum displacement A of $10^{-4}$m (0.1mm), the following equations apply:

Displacement = A Sin $\omega t$

Velocity = $\omega$A Cos $\omega t$ = 3.1 m/sec peak or one percent of the speed of sound Acceleration = $-\omega^2$ Sin $\omega t$ = $10^5$ m/sec$^2$ or 10,000 the acceleration due to gravity Now considering the film motion, assuming the film 2 is free to move, is open to the atmosphere on the emulsion side 80, and is spaced 0.2 mm from the vibrating platen 70 on the back side 82 of the film 2. The resonant frequency $f$ of the film 2 of the mass density $m$ (g/cm$^2$), with a distance $d$ = 0.5 mm depth of undulations 74 of the backing plate 72, and in an air atmosphere exerting an approximate force F of 981 × $10^3$ dynes/cm$^2$ is as follows:

$$f=\frac{1}{2\pi}\left[\frac{F}{(m)(d)}\right]^{1/2}$$

letting:

$m$ = 0.015 g/cm$^2$ for 0.1 mm thick mylar film $d$ = 0.05 cm $$f=\frac{1}{2\pi}\left[\frac{(981)(10^3)}{(0.015)(0.05)}\right]^{1/2}=5.8\text{ KHz.}$$

The airmass may be neglected, as the wavelength of 5.8 KHz in air is about 5 cm and the spacing between the film 2 and the platen 70 is 0.02 cm. If the vibrating platen 70 and the film 2 are considered as two coupled resonant systems and require a single resonant frequency then, $k \quad \sqrt{Q_1 Q_2}$ should be less than one, where $k$ is the coupling coefficient.

$Q_1/2\pi$ is the maximum kinetic energy stored in the platen divided by the energy radiated per cycle.

$Q_2/2\pi$ is the same quantity for the photographic film. Max Energy stored is $(m/2)\,(A\omega)^2$ = 7.5 ergs/cm$^2$. Energy radiated per cycle = Mass of one wavelength of air/2 $(A\omega)^2$ = 375 ergs/cm$^2$.

$Q_1 = 2\pi(7.5/375) = 0.125$ $Q_2$ has a similar small value. If $k$ is its maximum of $k$ = 1, then $k \quad \sqrt{Q_1 Q_2} < 1$. Hence, there is only one resonant frequency and $Q_1$ and $Q_2$ are so small that the response is almost aperiodic.

A spacing between film 2 and moving platen 70 of 0.2 mm is a suitable choice and should be acceptable even at 10KHz. The low Q assures low phase shift dependence on frequency or spacing. In order to conserve acoustic power, the space between the film 2 and a physical portion 84 of the image forming means such as the intensifier, should be made an acoustic resonant cavity. By arranging the transducer or coupler 76 with adjoining substantially planar physical portions of the image forming means 84, in desired spaced relation to the film 2 as shown in FIG. 3, an acoustic resonant cavity is provided. This means that the distance A between the film 2 and the bottom of the cavity 84, should be approximately a quarter wavelength or about 15 mm for a frequency of 5 KHz, with the distance between the output of transducing means or coupler 76 and the film 2 in the range of 10 to 40 microns. For such an arrangement the required power is thus reduced from about 6 W, by approximately an order of magnitude. It appears probable that a smaller film vibration amplitude than 0.1 mm will give the required performance. If the vibration amplitude is halved to say 0.05 mm, then the required acoustic power will be reduced to one quarter.

What is claimed is:

1. Apparatus for transducing information with an optical record medium, comprising; means for continuously transporting said optical record medium along a given path, transducing means fixedly mounted in stationary spaced relation with respect to the path of said optical record medium, said transducing means having normally disabled imaging forming means, means for producing continuous oscillatory motion of said record medium in a direction toward and away from said transducing means to provide intermittent contacting relation between said record medium and said transducing means as said record medium is continuously transported along said given path, and means for enabling said image forming means only when said record medium is in contacting relation with said transducing means.

2. The invention according to claim 1, wherein; said means for producing oscillatory motion of said record medium includes, means for generating acoustic vibrations at a given frequency with said image forming means arranged in spaced relation with said recording medium to form an acoustic cavity which is resonant at the operating frequency of said generating means.

3. The invention according to claim 1, wherein said optical record medium is a film, said image forming means includes a fiber optic coupler having a first end disposed in spaced cooperative relation with said film, the other end of said coupler being coupled to an image intensifier, said image intensifier being controllably operable in response to a signal applied thereto to transmit an image to said first end of said coupler, a platen disposed in spaced relation to said film, means responsive to a signal applied thereto for oscillating said platen to generate acoustic energy imparted to said film, and means for applying related signals to said image intensifier and said platen oscillating means to cause synchronous operation thereof.

* * * * *